United States Patent [19]

Hughes, Jr.

[11] Patent Number: 4,992,397

[45] Date of Patent: Feb. 12, 1991

[54] LOW THERMAL CONDUCTIVITY, HIGH STRENGTH REFRACTORY CASTABLE COMPOSITION WITH HIGH ABRASION RESISTANCE

[76] Inventor: Gustav O. Hughes, Jr., 7932 Westmoreland Ave., Pittsburgh, Pa. 15218

[21] Appl. No.: 306,923

[22] Filed: Feb. 6, 1989

[51] Int. Cl.$^5$ .................. C04B 35/14; C04B 35/44
[52] U.S. Cl. .................. 501/124; 501/128; 501/129; 501/133; 106/692
[58] Field of Search .............. 106/104, 692; 501/124, 501/128, 129, 133

[56] References Cited

U.S. PATENT DOCUMENTS 4,656,146 4/1987 Schlett et al. .................. 501/124
4,680,279 7/1987 Kleeb .................. 501/124

FOREIGN PATENT DOCUMENTS 642924 6/1962 Canada .................. 501/124

*Primary Examiner*—William R. Dixon, Jr.
*Assistant Examiner*—Melissa Bonner
*Attorney, Agent, or Firm*—Sigalos, Levine & Montgomery

[57] ABSTRACT

A low thermal conductivity, high strength refractory castable composition with high abrasion resistance consisting essentially of about 55 to 80% by weight amorphous silica, about 5 to 25% by weight of a calcined alumino-silicate aggregate having a density of about 30 to 70 pcf and a particle size of about −10 to +65 mesh, about 5 to 40% by weight of calcined fireclay fines, about 1 to 10% by weight of a flow aid for particle packing, and about 5 to 25% by weight of a calcium aluminate cement.

7 Claims, No Drawings

LOW THERMAL CONDUCTIVITY, HIGH STRENGTH REFRACTORY CASTABLE COMPOSITION WITH HIGH ABRASION RESISTANCE

BACKGROUND OF THE INVENTION

The present invention relates to refractory castable compositions characterized by high abrasion resistance, high strength, and relatively low thermal conductivity.

Refractory castables are hydraulic setting compositions consisting of granular refractory aggregates and a refractory cement binder. Such materials are shipped as dry mixes to the location where they are to be used and then mixed with sufficient water to bring the mix to the desired consistency. The amount of water depends on whether the mix is to be cast, tamped, rammed, troweled, or gunned into position The reaction between the water and the cement additive develops a strong set at ambient temperature and later, as temperature is elevated such as in any furnace environment where the castable is applied, a strong ceramic bond develops as the cement bond further reacts with the refractory aggregate.

Such castables are particularly well suited for furnace linings having irregular contours.

One such application is the application of castables in connection with fluid catalytic cracking units and fluid coking units which are utilized by the petroleum industry to crack oil into a variety of products. In such units and transfer lines connected thereto highly abrasive catalysts or coke travel at high speed and cause erosion, in some cases extreme erosion, of the castable linings used. Therefore, one of the foremost requirements of a refractory castable for service in these units is abrasion resistance.

High abrasion resistance has been achieved by adding a hard, dense aggregate to the castable mix or by selecting certain fines which, when heat treated with the cement, form a hard, abrasion-resistant matrix. Another method of obtaining abrasion resistance is to use relatively large amounts of refractory cement which, when cured and fired, results in a hard bond.

Because of the relatively low temperatures involved in such petrochemical processes and the large expense of a fuel source, the need exists to conserve heat within the catalytic crackers This is usually accomplished by selecting refractory materials with low thermal conductivity. However, there is this difficulty of high resistance to abrasion. The materials which are highly abrasion resistant tend to be dense and dense materials inherently have high thermal conductivity. While both density and thermal conductivity may be lowered by adding a lightweight aggregate to the mix, the lightweight aggregates tend to be porous and poorly bonded and, hence, they have poor abrasion resistance.

Efforts to overcome that problem include utilizing amorphous silica with a calcium aluminate cement and a calcined high density refractory fine having a density of at least about 140 lb/ft$^3$ as set forth in U.S. Pat. No. 4,656,146. While generally satisfactory, such compositions still do not have the degree of strength combined with low thermal conductivity that are required in such petrochemical processes.

SUMMARY OF THE INVENTION

The present invention improves the existing castables to provide a low thermal conductivity, high strength refractory castable with high abrasion resistance.

Briefly, the present invention comprises a low thermal conductivity, high strength refractory castable dry mix composition with high abrasion resistance consisting essentially of about 55 to 80% by weight of amorphous silica, about 5 to 25% by weight of a calcined alumino-silicate aggregate having a density of about 30 to 70 pcf and a particle size of about −10 to +65 mesh, about 5 to 40% by weight calcined fireclay fines, about 1 to 10% by weight of a flow aid for particle packing, and about 5 to 25% by weight of calcium aluminate cement.

DETAILED DESCRIPTION

In order to have a suitable composition, that is, one having the necessary high strength together with the low thermal conductivity, it is essential to have the components noted, and particularly the calcined alumino-silicate aggregate with the density and particle size noted.

With respect to the silica, it can be any amorphous silica such as a vitreous or fused silica, preferably sized −3 mesh to +65 mesh. Fused silica is known to be a thermal insulator. However, it must be carefully used since fused silica lacks the necessary abrasion resistance. Prior art such as U.S. Pat. No. 4,656,146 shows that increase of abrasion resistance can be effected by the use of dense fire clay grains and/or fine aluminas as addition to the mix. However, these additives in combination with calcium aluminate cement often result in undesirably high thermal conductivity.

As to the calcined alumino-silicate aggregate, it must have a density of about 30 to 70 pounds per cubic foot (pcf) and a particle size of about −10 to +65 mesh (Tyler Standard). This is critical since calcined alumino-silicate aggregates without the density and particle size set forth will not give the desired result. Bloated and unbloated aggregates can be used.

In order to assist in abrasion resistance, there must also be utilized dense fireclay grains; most preferably calcined flint fines or flint clay ball mill fines. This aggregate should have a density of at least about 140 pcf and particles sized −65 mesh (Tyler Standard) and finer.

With respect to the flow aid, it is preferred to utilize volatilized silica, also known as fumed or microsilica, for ensuring particle packing to give the composition the density desired for proper abrasion resistance. Minor amounts of alumina can be used with the volatilized silica, but the alumina cannot be used alone.

The calcium aluminate cement is that conventionally used in castables as set forth, for example, in U.S. Pat. No. 4,656,146.

As to proportions, the table below sets forth the operative ranges and their preferred ranges for the components of the composition.

|  | Operative (% by wt.) | Preferred (% by wt.) |
| --- | --- | --- |
| Amorphous silica | 32–80 | 42–75 |
| Calcined alumino-silicate | 5–25 | 10–20 |
| Calcined fireclay | 5–40 | 10–20 |
| Volatilized silica | 1–10 | 5–8 |

-continued

| | Operative (% by wt.) | Preferred (% by wt.) |
|---|---|---|
| Calcium aluminate cement | 5–25 | 10–20 |

The composition is formed by simply admixing the components thoroughly to ensure a thorough mixing and the product then packaged. As indicated above, these refractory castables are hydraulic setting compositions and they are shipped as dry powders to the site to where they are to be used and admixed with water to bring the mix to the desired consistency; ordinarily up to about 10% by weight for each 100% by weight of the dry mix. As noted, these compositions can be used by casting, tamping, ramming, trowelling, gunning and any of the like procedures by which refractory castables are used.

The invention will be further described in connection with the following examples which are set forth for purposes of illustration only and in which proportions are in percent by weight and mesh sizes are Tyler Standard unless expressly stated to the contrary.

EXAMPLES 1 TO 4

A series of four compositions were formed and tested for strength, abrasion resistance, and thermal conductivity with Example 1 being a prior art castable composition containing vitreous silica, flint clay, alumina, and a calcium aluminate cement, but not the calcined alumino-silicate aggregate having a density of 30 to 70 pcf and a particle size of −10 to +65 mesh of the present invention. The calcined alumino-silicate used in Examples 2, 3, and 4 was the commercially available product Verilite 50, and it has a density of 50 pcf and a sizing of −10 to +65 mesh.

TABLE I

| | Example No: | | | | | | | |
|---|---|---|---|---|---|---|---|---|
| | 1 Prior Art | | 2 | | 3 | | 4 | |
| Mix: | | | | | | | | |
| *Vitreous Silica,* | | | | | | | | |
| 3/10 mesh | 22% | | 40% | | 32% | | 35% | |
| 10/28 mesh | 15 | | 4 | | — | | — | |
| 28/65 mesh | 9 | | 3 | | — | | — | |
| −65 mesh | 4 | | — | | — | | — | |
| Calc. alumino-silicate aggregate | — | | 10 | | 20 | | 10 | |
| Fillite 52/7/S | — | | — | | — | | 10 | |
| Calc. Flint Clay (BMF 50) | 5 | | 25 | | 30 | | 24 | |
| Alumina (A-17) | 9 | | — | | — | | — | |
| Volatilized Silica (Reynolds VS Silica) | 1 | | 3 | | 3 | | 3 | |
| Calcium Aluminate Cement (CA 25) | 35 | | 15 | | 15 | | 15 | |
| Plus Additions: | | | | | | | | |
| Casting Water Required | 12.0 | | 9.0 | | 11.0 | | 12.5 | |
| Screen Analysis | 5 | 5 | 7 | 7 | 6 | 6 | 7 | 7 |
| % Held on 4 mesh | | | | | | | | |
| 6 | 7 | | 8 | | 7 | | 7 | |
| 8 | 5 | | 8 | | 6 | | 7 | |
| 10 | 5 | 17 | 9 | 25 | 6 | 19 | 7 | 21 |
| 14 | 5 | | 7 | | 7 | | 7 | |
| 20 | 5 | | 4 | | 5 | | 4 | |
| 28 | 6 | 16 | 6 | 17 | 8 | 20 | 5 | 16 |
| 35 | 5 | | 5 | | 6 | | 4 | |
| 48 | 4 | | 2 | | 1 | | 1 | |
| 65 | 2 | 11 | 1 | 8 | 1 | 8 | — | 5 |
| 100 | 1 | | 1 | | 1 | | 3 | |
| 150 | 2 | 3 | 3 | 4 | 3 | 4 | 5 | 8 |
| 200 | 2 | | 3 | | 4 | | 5 | |
| 270 | 3 | | 4 | | 5 | | 5 | |
| 325 | 2 | | 3 | | 3 | | 3 | |
| Pass 325 mesh | 41 | 48 | 29 | 39 | 31 | 43 | 30 | 43 |
| Flowability | Fair | | Fair | | Good | | Excellent | |
| Comments: | Mix Sticky | | OK | | OK | | OK | |
| Bulk Density, pcf | | | | | | | | |
| After Drying at 250° F.: | 126 | | 122 | | 116 | | 96 | |
| After Heating to 1500° F.: | 119 | | 119 | | 113 | | 94 | |
| Modulus of Rupture, psi After Heating to 1500° F.: | 690 | | 770 | | 630 | | 240 | |
| Cold Crushing Strength, psi After heating to 1500° F.: | 5000 | | 5600 | | 4200 | | 1750 | |
| ASTM C 704 Abrasion After Heating to 1500° F. cu cm loss: | 24.9 | | 17.1 | | 23.5 | | 79.0 | |
| Dimensional Change from Dry Size After Heating 5 Hrs. to 1500° F. | | | | | | | | |
| % Linear: | −0.1 | | −0.1 | | −0.1 | | −0.1 | |
| % Volume: | 0.6 | | −0.6 | | −0.5 | | −0.2 | |
| Thermal Conductivity ASTM S 201 @ 1000° F. Btu/hr ft$^2$ °F./in.: | 8.0 | | — | | — | | — | |

The standard prior art castable does not meet the current specifications for strength as measured by modulus of rupture after heating the castable at 1500° F., abrasion resistance, and thermal conductivity which are, respectively, about 700 to 1400, 14 to 20, and 5.5 to 7.5. The standard product had the calcined alumino-silicate aggregate of the instant composition added thereto in amounts of 10 to 20% in Examples 2 to 4. These additions had an adverse effect on density without an adverse effect on abrasion resistance.

In Example 4 the calcined alumino-silicate aggregate of the instant invention was combined with another material used for some instances to lower thermal conductivity; namely, Fillite 52/7/S. This material consists of hollow alumino-silicate spherical particles having a particle size of −52 mesh. This combination resulted in degradation of all of the properties that are required of the castable; namely, it had an adverse effect on density and abrasion resistance. It will be noted that none of the mixes was entirely suitable, even those containing the particular calcined alumino-silicate aggregate of the instant invention since too little volatilized silica was utilized, and water contents may have been too high.

EXAMPLES 5 AND 6

The compositions were made in accordance with the instant invention in which VS silica was increased. This is a submicron volatilized amorphous silica. These compositions were again formed into casting mixes and tested in the same manner as the compositions of Examples 1 to 4.

TABLE II

| | Example No: 5 | | Example No: 6 | |
|---|---|---|---|---|
| Mix: | | | | |
| Vitreous Silica, | | | | |
| 3/10 mesh | 36% | | 36% | |
| 10/28 mesh | 4 | | 4 | |
| 28/65 mesh | 2 | | 4 | |
| Verilite 50 | 15 | | 15 | |
| Calc. Flint Clay (BMF 50) | 23 | | 16 | |
| Alumina (A-17) | — | | 7 | |
| Volatilized silica | 5 | | 3 | |
| Calcium Aluminate Cement (CA 25) | 15 | | 15 | |
| Plus Additions: | 9.0 | | 8.5 | |
| Casting Water Required | | | | |
| Flowability: | Good | | Fair | |
| Mix Comments: | OK | | Sticky | |
| Screen Analysis | 7 | 7 | 7 | 7 |
| % Held on 4 mesh | | | | |
| 6 | 7 | | 7 | |
| 8 | 7 | | 7 | |
| 10 | 8 | 22 | 8 | 22 |
| 14 | 7 | | 7 | |
| 20 | 5 | | 5 | |
| 28 | 6 | 18 | 6 | 18 |
| 35 | 6 | | 6 | |
| 48 | 1 | | 1 | |
| 65 | 1 | 8 | 1 | 8 |
| 100 | 1 | | 1 | |
| 150 | 3 | 4 | 3 | 4 |
| 200 | 3 | | 5 | |
| 270 | 4 | | 4 | |
| 325 | 4 | | 4 | |
| Pass 325 mesh | 30 | 41 | 28 | 41 |
| Bulk Density, pcf | | | | |
| After Drying at 250° F.: | 120 | | 123 | |
| After Heating to 1500° F.: | 117 | | 120 | |
| Modulus of Rupture, psi | 1030 | | 1040 | |
| After Heating to 1500° F.: | | | | |
| Cold Crushing Strength, psi | 6420 | | 5940 | |
| After heating to 1500° F.: | | | | |
| ASTM Abrasion C 704 | 11.7 | | 13.5 | |
| After Heating to 1500° F. | | | | |
| cu cm loss: | | | | |
| Dimensional Change from | | | | |
| Dry Size After Heating | | | | |
| 4 Hrs. to 1500° F. | | | | |
| % Linear: | −0.1 | | 0.1 | |
| % Volume: | −0.5 | | −0.6 | |
| Thermal Conductivity | 6.0 | | — | |
| ASTM S 201 @ 1000° F. | | | | |
| Btu/hr ft² F./in.: | | | | |

It will be seen from the test results set forth above that the addition of the microsilica resulted in lower water requirement and improved casting ability. Moreover, after heat treatment at 1500° F., the casting mix showed improved strength, lower thermal conductivity and better abrasion resistance when compared to the standard mix of Example 1.

This makes clear that it is necessary to combine the microsilica with the particular calcined alumino-silicate to produce the desired effects. Example 6 shows that the use of alumina, which is also a known flow aid, was not as suitable in giving the desired cold strength or crushing strength or abrasion resistance as was the microsilica, although a combination of the micronized silica and the alumina addition was superior to the prior art composition.

EXAMPLES 7 TO 12

A series of mixes were made with varying compositions in order to explore the range of water levels to give the best casting properties, as well as to determine the effect of increasing the amount of the calcined alumino-silicate aggregate up to 25% by weight of the composition. The mixes and test results are set forth in Table III below.

TABLE III

| | Example No: | | | | | |
|---|---|---|---|---|---|---|
| | 7 | 8 | 9 | 10 | 11 | 12 |
| Mix: | | | | | | |
| Vitreous Silica, | | | | | | |
| 3/10 mesh | 36% | 36% | 36% | 36% | 32% | 30% |
| 10/28 mesh | 4 | 4 | 4 | 4 | 4 | 4 |
| 28/65 mesh | 2 | 2 | 2 | 2 | 2 | — |
| −65 mesh | — | — | — | — | — | — |
| Verilite 50 | 15 | 15 | 15 | 15 | 20 | 25 |
| Calc. Flint (BMF 50) | 23 | 23 | 23 | 18 | 22 | 21 |
| Alumina (A-17) | — | — | — | — | — | — |
| Volatilized Silica (Reynolds) | 5 | 5 | 5 | 5 | 5 | 5 |
| Calcium Aluminate Cement (CA 25) | 15 | 15 | 15 | 20 | 15 | 15 |
| Mix Variable: | Low Water | Med. Water | High Water | High Cement | Lower Wt. | Very Low Wt. |

TABLE III-continued

| | Example No: | | | | | |
|---|---|---|---|---|---|---|
| | 7 | 8 | 9 | 10 | 11 | 12 |
| Casting Water Required, %: | 8.0 | 9.0 | 10.0 | 9.0 | 9.0 | 9.0 |
| Flow Characteristics: | Poor | Good | Very Good | Good, Short Working Time | Very Good | Good |
| Bulk Density, pcf | | | | | | |
| After Drying at 250° F. (Av 5): | 120 | 118 | 116 | 119 | 115 | 110 |
| After Heating to 1500° F. (Av 3): | 117 | 115 | 114 | 115 | 113 | 107 |
| Cold Crushing Strength, psi (Av 3) | | | | | | |
| After Drying at 250° F. (Cubes): | 6820 | 6550 | 5400 | 6520 | 6210 | 4710 |
| After Drying at 250° F. (Cylinders): | 7100 | 5430 | 4970 | 7720 | 4910 | 2930 |
| After heating to 1500° F. (Cubes): | 5850 | 5750 | 5930 | 7450 | 5730 | 4670 |
| Modulus of Rupture, psi | | | | | | |
| After Drying at 250° F.: | 1300 | 1140 | 920 | 1530 | 1140 | 850 |
| After Heating at 1500° F.: | 940 | 1000 | 740 | 900 | 900 | 700 |
| C 704 Abrasion After Heating to 1500° F. cu cm loss: | 11.5 | 11.9 | 18.3 | 9.6 | 13.1 | 16.8 |
| Dimensional Change from Dry Size After Heating 5 Hours to 1500° F. (Av 3) | | | | | | |
| % Linear: | −0.1 | −0.2 | −0.2 | −0.2 | −0.2 | −0.2 |
| % Volume: | −0.5 | −1.0 | −1.0 | −0.4 | −0.7 | −0.2 |

The results show that the compositions of the present invention are operable over a wide range of water levels with the optimum water level being about 9%. An increase in the cement content showed that while this improved the physical properties, especially abrasion resistance, it has an adverse effect in decreasing the working time of the wet mix. Commercially, a relatively long working time is required so that the castable, after being admixed with the water, can be installed without premature setting up before the mix is entirely in place.

Examples 11 and 12 in which the higher levels of the calcined alumino-silicate aggregate where utilized showed that it was a tendency to decrease density, strength, and increase loss in the abrasion test.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A low thermal conductivity, high strength refractory castable dry mix composition with high abrasion resistance consisting essentially of about 32 about 80% by weight amorphous silica, about 5 to about 25% by weight of a calcined alumino-silicate aggregate having a density of about 30 to about 70 pcf and a particle size of about −10 to about +65 mesh, about 5 to about 40% by weight of dense calcined fireclay fines, about 1 to about 10% by weight of a flow aid for particle packing, and about 5 to about 25% by weight of a calcium aluminate cement.

2. The composition of claim 1 wherein said flow aid is a volatilized silica or a combination of volatilized silica and alumina.

3. The composition of claim 2 wherein said dense fireclay fines are calcined flint fines or flint clay ball mill fines having a density of at least about 140 pcf and particles sized −65 mesh or finer.

4. The composition of claims 1, 2, or 3 wherein said calcined alumino-silicate aggregate is bloated or unbloated.

5. A low thermal conductivity, high strength refractory castable dry mix composition consisting essentially of about 42 to about 75% by weight amorphous silica, about 10 to about 20% by weight of a bloated or unbloated calcined alumino-silicate aggregate having a density of about 30 to about 70 pcf and a particle size of about −10 to about +65 mesh, about 10 to about 20% by weight calcined flint fines or flint clay ball mill fines having a density of at least about 140 pcf and particles sized −65 mesh or finer, about 5 to about 8% by weight volatilized silica or a combination of volatilized silica and alumina, and about 10 to about 20% by weight of a calcium aluminate cement.

6. A low thermal conductivity, high strength refractory castable composition consisting essentially of the dry mix of claim 1 or 5 and for each 100% by weight thereof an amount of water added to bring the mix to the desired consistency.

7. The composition of claim 6 wherein the amount of water added is up to about 10% by weight.

* * * * *

UNITED STATES PATENT AND TRADEMARK OFFICE
CERTIFICATE OF CORRECTION

PATENT NO. : 4,992,397

DATED : February 12, 1991

INVENTOR(S) : HUGHES, Jr.

It is certified that error appears in the above-identified patent and that said Letters Patent is hereby corrected as shown below:

On the title page, item [73]

Add as assignee:   -- Dresser Industries, Inc. --; and

Column 7, line 52, after "32" insert -- to --.

Signed and Sealed this

Twenty-second Day of September, 1992

Attest:

DOUGLAS B. COMER

Attesting Officer

Acting Commissioner of Patents and Trademarks